(12) United States Patent
Baur et al.

(10) Patent No.: US 7,539,569 B2
(45) Date of Patent: May 26, 2009

(54) METHOD FOR OPERATING A SENSOR IN A SAFETY SYSTEM

(75) Inventors: Richard Baur, Pfaffenhofen (DE); Yan Lu, Freising (DE); Ralph Neuberger, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/449,590

(22) Filed: Jun. 9, 2006

(65) Prior Publication Data

US 2006/0229785 A1 Oct. 12, 2006

Related U.S. Application Data

(63) Continuation of application No. PCT/EP2004/014048, filed on Dec. 9, 2004.

(30) Foreign Application Priority Data

Dec. 10, 2003 (DE) ................. 103 57 551
Oct. 23, 2004 (DE) ............. 10 2004 051 638

(51) Int. Cl.
*H01L 41/00* (2006.01)
(52) U.S. Cl. ........................ 701/45; 381/150
(58) Field of Classification Search ............ 701/45–47; 73/578, 579, 581–584, 587–589, 595; 381/150, 381/353, 173–178, 190, 191; 700/280
See application file for complete search history.

(56) References Cited

U.S. PATENT DOCUMENTS

| | | | | |
|---|---|---|---|---|
| 4,346,914 A | | 8/1982 | Livers et al. | |
| 4,467,271 A | * | 8/1984 | Ruckenbauer et al. | 324/727 |
| 5,375,468 A | * | 12/1994 | Ohta et al. | 73/514.29 |
| 5,416,360 A | * | 5/1995 | Huber et al. | 307/10.1 |
| 5,434,783 A | * | 7/1995 | Pal et al. | 701/36 |
| 5,445,412 A | * | 8/1995 | Gillis et al. | 280/735 |
| 5,447,051 A | * | 9/1995 | Hanks et al. | 73/1.15 |
| 5,457,982 A | * | 10/1995 | Spies et al. | 73/1.38 |
| 5,458,222 A | * | 10/1995 | Pla et al. | 188/378 |
| 5,473,930 A | * | 12/1995 | Gademann et al. | 73/1.38 |
| 5,656,882 A | * | 8/1997 | Lazarus et al. | 310/328 |
| 5,753,793 A | * | 5/1998 | Lindahl et al | 73/1.15 |
| 5,812,684 A | * | 9/1998 | Mark | 381/86 |
| 6,138,996 A | * | 10/2000 | Hayashi et al. | 267/136 |

(Continued)

FOREIGN PATENT DOCUMENTS

DE 35 42 397 A1 11/1985

(Continued)

OTHER PUBLICATIONS

International Search Report dated Jul. 5, 2005 (Twelve (12) pages) including English Translation of Relevant Portion.

(Continued)

*Primary Examiner*—Dalena Tran
(74) *Attorney, Agent, or Firm*—Crowell & Moring LLP

(57) ABSTRACT

In a safety system and a method of operating a sensor in a safety system, the sensor transmits an electric reaction signal to a central system unit, and is also excited by the central system unit by a diagnostic and/or excitation signal as a reversible electro-mechanical system.

21 Claims, 4 Drawing Sheets

U.S. PATENT DOCUMENTS

| | | | |
|---|---|---|---|
| 6,191,519 B1 * | 2/2001 | Nye et al. | 310/316.01 |
| 6,204,756 B1 * | 3/2001 | Senyk et al. | 340/438 |
| 6,698,269 B2 * | 3/2004 | Baber et al. | 73/1.08 |
| 6,929,282 B1 * | 8/2005 | Zoratti et al. | 280/735 |
| 2001/0010497 A1 * | 8/2001 | Riley | 340/665 |
| 2004/0059487 A1 * | 3/2004 | Lich et al. | 701/45 |
| 2006/0064180 A1 * | 3/2006 | Kelkar et al. | 700/28 |
| 2006/0123918 A1 * | 6/2006 | Ogisu et al. | 73/774 |

FOREIGN PATENT DOCUMENTS

| | | |
|---|---|---|
| DE | 38 09 299 A1 | 9/1989 |
| DE | 40 25 564 C1 | 8/1990 |
| DE | 40 26 664 C1 | 9/1991 |
| DE | 44 39 886 A1 | 11/1994 |
| DE | 197 57 118 A1 | 12/1997 |
| DE | 197 57 118 A1 | 1/1999 |
| DE | 199 57 187 A1 | 5/2001 |
| EP | 0 893 309 A1 | 6/1998 |
| WO | WO 03/062780 A1 | 7/2003 |

OTHER PUBLICATIONS

German Office Action dated Jun. 13, 2008.

* cited by examiner

METHOD FOR OPERATING A SENSOR IN A SAFETY SYSTEM

This application is a Continuation of PCT/EP2004/014048, filed Dec. 9, 2004, which claims the priority of German Patent Document DE 103 57 551.0, filed Dec. 10, 2003 and German Patent Document DE 10 2004 051 638.3, filed Oct. 23, 2004, the disclosures of which is expressly incorporated by reference herein.

BACKGROUND AND SUMMARY OF THE INVENTION

The present invention relates to a safety system and to a method of operating a sensor in a safety system. It is known that sensors are used as signal generators in safety systems. Sensors considered within the scope of the present invention are used for sensing at least one form of material stress, such as occurs as a result of tensile and/or compressive forces during the deformation of material, and also during the transmission of structure-borne noise. Such sensors and related safety systems are used as accident signaling devices in the aerospace industry and the motor vehicle industry, among other fields.

It is an object of the present invention to provide a more reliable method of operating at least one sensor in a safety system, and to provide a corresponding safety system.

This and other objects and advantages are achieved by the safety system and method according to the invention, in which at least one sensor is provided that, in addition to its sensor characteristic, also has the characteristic of an actuator. Such a reciprocal method of operation is known in the case of several types of converters, including among others, piezo electric devices which are crystal structures that exhibit a charge separation on their surfaces under the effect of tension and pressure, such that an electric voltage can be tapped at their outside, by way of electrodes. Inversely, it is also possible to deform a piezo-electric crystal by applying an electric voltage to the outside. Accordingly, by an appropriate selection of the material and shape of the piezo-electric crystals, it is possible to convert surface deformation and structure-borne noise effects over a wider frequency range, to electric signals by way of the connected mechanical deformations of the a piezo sensor element. On the other hand, surfaces can also mechanically be caused to vibrate by electric signals by means of the same piezo sensor because of its suitability as an actuator.

In addition to the use of quartz based piezoelectric crystals, which may also be constructed as ceramic elements on a barium titanate or $BaTiO_3$, or lead zirconium titanate or PZT basis, the use of piezo-electric plastic foils or films has also become known. $BaTiO_3$ powder can be converted to a ceramic body with component or sensor dimensions, and with a solid shape, by sintering a compression-molded powder. In contrast, piezo-electric plastic foils are lastingly flexible, have a thickness of only approximately 5 to 500 µm, are light, and can be made into any flat shape almost arbitrarily, by a simple cutting. The plastic materials which are used for this purpose are, as a rule, highly polar substances which are heated during production of the foil, and are subjected to a very static electric field, for a uniform alignment of the molecules. In the course of cooling, this forced alignment of the molecules is virtually firmly frozen into the foil body. Thus, for example, German Patent Document DE 40 25 564 C1 suggests the use of polyvinylidenfluoride PVDF or other polymers consisting of polar molecules. In each case, the above-mentioned substances, which are considered as passive structural parts, already have a charge potential, and exhibit a measurable capacitive charge change under the effect of pressure. As a result, feeding by an external voltage source is unnecessary.

The above-mentioned materials share the common feature that the characteristics of the sensor and the actuator can be combined in one system, so that a simple self-test is possible, under the control and the subsequent analysis by a central system unit. For this purpose, the sensor element is first controlled as an actuator, and the excited mechanical vibration can again be sensed as an electric signal if the element is operating without disturbance. As a result, a sensor can therefore be checked at any time without additional equipment-related expenditures with respect to signal generators, etc., and can be monitored for its operating characteristics.

However, in addition to the self-tests, by means of the actuator operation a mechanical vibration can also be induced in a system to be secured, and the same element can be used, subsequently, to perform an analysis of the excited vibration with an examination of the characteristics of the system, which can be supplied to an analyzing unit of the actual safety system. Thus, in addition to deformations of the material, cracks and disturbances can also be detected, particularly by a deviation in the frequency pattern of the system response. A suggested method of operating a sensor with a reciprocal operating mechanism in a safety system therefore provides the advantages of a reliable self-test as well as the advantage of a safety check and system analysis which requires low expenditures and has a negligible interference influence, in a total mechanical system to be monitored, with the possibility of a diagnosis for the conclusion of each check.

In an advantageous further embodiment of the invention, a safety system comprises a plurality of sensors which are distributed over a structure to be secured, as the observation or monitoring area. In some sense, the mechanical structure to be observed is therefore covered by a network of sensors which, by the distribution and distribution density of the sensors, takes into account a respective peculiarity of the mechanical structure. Also in this arrangement, each individual sensor can also carry out a self-test by analyzing the residual vibrational behavior after an active test excitation by means of a predefined test signal and of a received measuring signal in the above-illustrated manner. In addition, it is possible to carry out a surface covering evaluation for the analysis of faults and/or disturbances, by actively exciting a sensor, and analyzing the measuring signals received from all sensors. All sensors can be constructed and fixed in the same manner and therefore can be part of one sensor series or of one type.

Furthermore, in modern vehicles, extensive resonance phenomena occur, which can be clearly perceived as noise also in a vehicle interior. In the form of mechanical steady-state vibrations and standing waves, such resonance phenomena lead to increased wear and stability problems on carrying parts, due to increased stress. One example of these frequently occurring problems are vehicle occupant compartments or cabins which were constructed using new composite materials based on carbon fibers or carbon-fiber-reinforced plastic composite materials. These light and extremely hard materials are used particularly in space flight, in aircraft construction and increasingly also in motor vehicle construction. Since carbon-fiber-reinforced plastic materials do not significantly dampen vibrations, because of their high inherent rigidity, vibrations within the moving systems are conducted away from an originating site (for example, from a wheel suspension, an engine or a turbine), toward the cabin or a vehicle occupant compartment. Particularly when used in a commercial aircraft, the noise level from a rear turbine via the occupant compartment (as a rigid tube) is still acoustically intensified by the fact that carrying parts of the floor and of the ceiling operate as sounding boards.

Over longer periods of time, such noise events may have harmful effects on health; they definitely decrease the ability to concentrate and impair the well-being of the vehicle drivers and passengers. The described phenomenon is therefore safety-relevant in two respects. The vibrations occurring in the above described example can now be detected in a selective manner by the use of a plurality of sensors according to the invention. Thus, maxima and minima of a resonance phenomenon can be determined in a distributed manner, by analysis of the received signals over a surface or another structural shape. By means of an active triggering of the actuator characteristics of the sensors according to the invention, vibrations can be damped by triggering an antiphase excitation, and ideally, resonances can be eliminated Another difficulty that occurs, with the use of carbon-fiber-reinforced plastic materials is the provision of a durable connection between the different components of bearing and/or safety-relevant structures. In the area of metallic materials, it is known that steel types and aluminum cannot be connected by welding. But different types of steel also cannot be welded to one another, or can be welded only to a very limited degree. In addition, there are construction materials, such as the so-called multiphase steel types, which, due to their special characteristics, would be damaged considerably by the entry of heat during a welding operation.

In the areas mentioned above as examples, in addition to applications in aviation, many different adhesive joints are now increasingly found in motor vehicle construction. Sensors on a foil carrier (specifically, sensors constructed in the form of piezo-electric plastic foils) can also be used in a particularly advantageous manner for monitoring the durability and reliability of such adhesive connections. In one application form, piezo-electric sensors span and/or cover an adhesive joint in the form of a foil. In this case, the foil preferably extends from one structural component to the other structural component or components which are connected with one another by the adhesive joint. After an initial or starting calibration of the signals emitted by the sensors of the foil under normal conditions, changes of the adhesive joint due to tensile or compressive loads of individual sensors of the foil can be electrically measured. A continuous detachment of the adhesive connection can therefore be determined as well as, for example, a tearing or even tearing-off caused by an accident.

Irrespective of this application purpose, in the event of nonharmonic vibrations, such as occur for example as a result of disturbances, crashes or outside contact as well as pedestrian recognition, etc., it becomes possible to achieve precise recognition of a particular event, and to locate it by way of the respective sensor elements. Suitable countermeasures can then be triggered in a targeted manner by subsystems connected to the output side of the safety system as a whole, particularly the targeted and precisely defined triggering of seat belt tighteners, different air bag systems or other active safety components.

The method according to the invention therefore provides that robust, overload-resistant, cost-effective sensors are used which are capable of carrying out a self-diagnosis. Such sensors can be durably and reliably retrofitted, by embedding, gluing-on, screwing-on or the like at various points. For constructing a pure early-warning system for accidents, bumpers, doors, roof areas and the engine hood of a motor vehicle are particularly suitable. Advantageously, a sensor already provided for a parking distance control unit, abbreviated PDC, with a reversible characteristic in the form of a piezo element can also be used according to the invention, so that synergistic effects can be utilized.

Other objects, advantages and novel features of the present invention will become apparent from the following detailed description of the invention when considered in conjunction with the accompanying drawings.

BRIEF DESCRIPTION OF THE DRAWINGS

FIG. 6a depicts a pedestrian protection device; and

FIG. 6b is an enlarged sectional view in the plane A-A of FIG. 6a.

DETAILED DESCRIPTION OF THE DRAWINGS

In the following text, identical reference numbers are used for the same elements in the figures.

Figure 1:
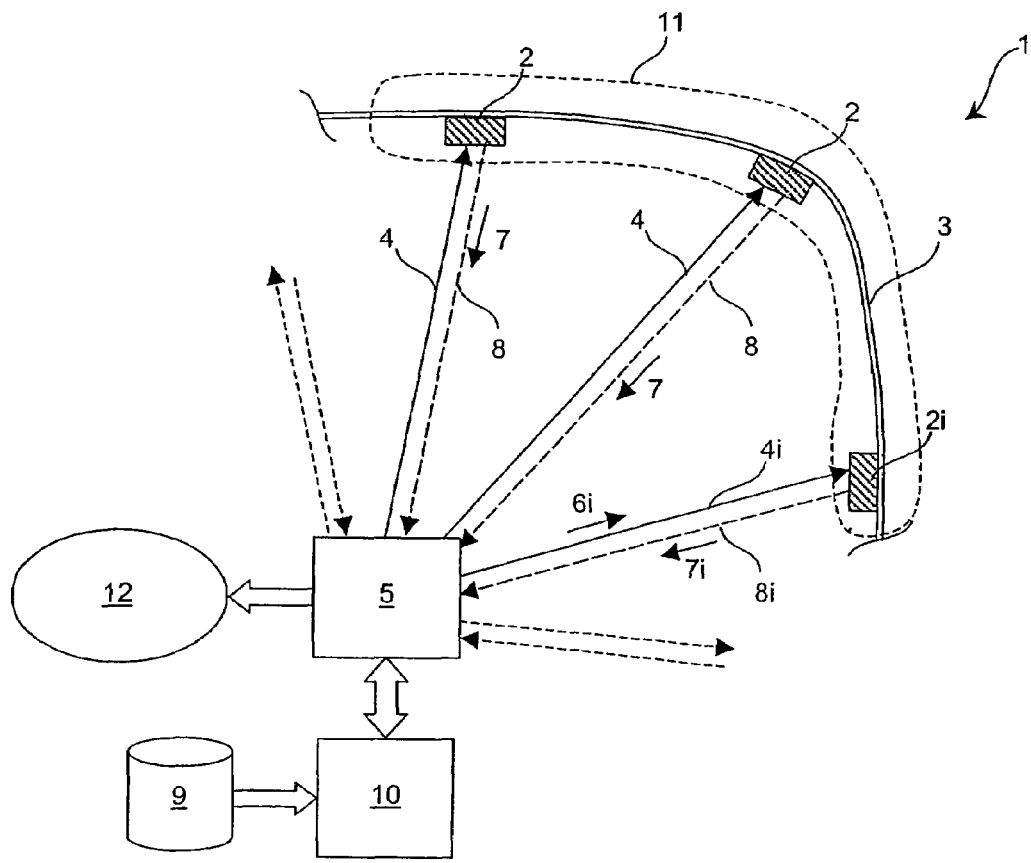
FIG. 1 is a schematic representation of a safety system 1 according to the invention.

The safety system 1 comprises a plurality of sensors 2 which are arranged on a motor vehicle as illustrated as a cut-out in FIG. 1. The sensors 2 are fixed on the interior of the vehicle on the metal sheet of a left front fender by gluing and/or welding. Each sensor 2 is connected with a central system unit 5 by means of a signal line 4, which is used as a feed line for a diagnostic and/or an excitation signal that is converted to a mechanical signal by the respective sensor 2. For this purpose, the sensor 2 is constructed as a reciprocally acting converter, such as a piezo-electric converter. Thus, upon the initiation of an excitation signal as the signal $6i$ at a particular sensor $2i$, a reaction signal $7i$ can be fed back to the central system unit 5 by way of a return line $8i$ of this sensor $2i$. The reaction signal $7i$ of each triggered sensor $2i$ shows that the respective sensor $2i$ could be electrically addressed and reacted mechanically, in which case, this reaction could be reconverted again. Thus, the reaction signal $7i$ serves as a simple self-test, and an analysis of the reaction signal $7i$ supplies further information concerning the operability of the respective sensor $2i$. Each of the sensors 2 is therefore capable of performing a self-diagnosis according to the same testing pattern, without need of any additional devices. The central system unit 5 is constructed for routine implementation of such self-tests for all sensors 2 of the safety system 1, and for the analysis of the received reaction signals 7 of the respective triggered sensors 2.

The mechanical system response of the sensor 2 to the excitation signal of the central system unit 5 is propagated by the rigid coupling of the sensor 2 with the metal sheet in the form of a mechanical wave in the fender 3 considered in the present case. Because of the signal propagation over the fender 3, additional reaction signals 7 of the other sensors 2 are also reported to the central system unit 5 by way of the respective return lines 8.

However, because of the distribution of several sensors 2 over the area of a fender 3 (shown here only as an example), the illustrated safety system 1 has expanded detection and analysis capabilities: Each of the sensors 2 has its own signal line 4 as well as an own return line 8. As a result, the respective turn-on signals can be used in a targeted manner, and the reaction signals 7 can be unambiguously assigned to a respective sensor 2 and, in connection therewith, to a certain position on the fender 3. Each piezo sensor 2 is capable of carrying out a separate self-diagnosis, so that the safety system 1 as a whole can also carry out a self-diagnosis because it is built up in a flexibly expandable manner as a network on the robust and cost-effective piezo sensor elements 2 as the basic modular units.

Upon the emission of an excitation signal by the central system unit 5 to a sensor 2*i*, each sensor 2 emits its own reaction signals 7 by way of the assigned return lines 8 to the central system unit 5. As a result, in addition to monitoring operational readiness of the piezo-electric sensors 2 based on a fault analysis, it is also possible to perform both a general monitoring of the mechanical characteristics of the fender 3 and damage control, by evaluating the reaction signals 7 in the central system unit 5. For this purpose, the central system unit 5 is connected with a databank 9 as well as a model 10 of a respective monitoring area 11 (FIGS. 2-5; the fender 3 in FIG. 2.). In the databank 10, the characteristics of reaction signals 7 of the respective sensors 2 during disturbance-free operation in an intact condition are stored as a function of each sensor as an exciting actuator, together with information regarding the distribution of the respective sensors over the fender 3, as the monitoring area 11. By interconnecting the central system unit 5 with the databank 9 as well as the model 10, deviations from a control behavior can now be determined for each of the sensors 2 and, on the basis of the model 10, can be assigned to one or more sections of the monitoring area 11.

Adhesion of an object or material, and even more so even a fairly small dent, change the mechanical vibration characteristics of a fender 3 significantly. Such changes can now be compared with a disturbance-free system response so that the area with adhesions or even damage can be recognized and indicated in a targeted manner. This is important because adhesions of ice, snow or caked-on mud, etc. may cause operating disturbances. Examinations of the above-mentioned type are naturally also expanded to further mechanically bearing elements and connection of the chassis.

The above-described methods of operating one or more sensors in a safety system are based on a targeted mechanical excitation which can be triggered within the system by the central system unit 5. Static disturbances are thereby detected in the manner of a safety check. For this purpose, it is therefore not particularly necessary that a functional impairment or other disturbance itself be manifested as a sound emission. The above-described system 1 can also be used to detect and analyze dynamic and/or nonharmonic external excitations. Among other phenomena, such external vibration excitations are, among other phenomena, caused by deformations of parts, and radiate into a monitoring area 11 if they do not take place within the monitoring area 11. As a result of the manner of their propagation and their respective frequency pattern, they supply strong indications of disturbances which are caused by an external contact. Examples of such external contacts are accident-caused contacts with a pedestrian or bicyclist or crashes in connection with a vehicle collision.

The distribution of the sensors 2 over a monitoring area 11 makes it possible for the safety system 1, by means of the central system unit 5, to very quickly register starting deformations and to locate them within the monitoring area 11, or outside by means of a locating system. Furthermore, it becomes possible to diagnose the seriousness of an accident, based on the course and the progression of the deformations. For this purpose, data of the databank 9 are used again and a model is used for locating.

By using such a detailed database, the central system unit 5 can supply reliable information to a safety device 12 with the assigned subsystems. Initiated by the safety device 12, different air bag and belt tightening systems can then be operated, and additional known safety measures can be taken according to a coordinated protection strategy, which depend on the type and seriousness of a respective disturbance or of an accident. The control takes place on the basis of a databank 9 and/or of a model 10 which are coordinated for taking into account the respective mechanical peculiarities of the present monitoring area (11). In the case of accidents involving pedestrians or bicyclists, a so-called active engine hood is preferably triggered as a safety measure, which is lifted in the area over the engine compartment or set at an angle, in order to reduce impact intensity or enlarge a crumple zone.

Finally, by means of the above-described safety system 1, a distributed device for generating a countersound, etc. can also be illustrated. A motor vehicle consists of a large number of partial systems which can vibrate either individually or jointly. Resonances occur with a frequency range that extends from a low-frequency (the tactile and, in particular, audible frequency range) into the ultrasonic range. In the low-frequency range, for example, driving characteristics may be very negatively affected, particularly by a building-up. In the audible range, the well-being or even the concentration of the passengers are affected.

However, all types of resonances impair the mechanical stability (and thus the operating reliability and durability) of a vehicle to a lasting extent. Thus, it is highly advantageous to utilize the safety system 1 with the distributed sensors 2 as a diagnostic network for tracing the sound sources. In this case, not only an engine or wheels with wheel suspensions are to be considered as sound sources. Rather, resonance zones are created by the propagation of mechanical sound waves at a distance from these vibration generating devices, which resonance zones, in turn, then also emit sound intensified by vibrations. For a more precise location of such resonance sources by the sensors 2 and knowledge of the structural situations as filed in the model 10, targeted countervibrations can be initiated by the actuator characteristics of the sensors 2, which cancel vibrations in the resonance zones by destructive interference.

Figure 2:
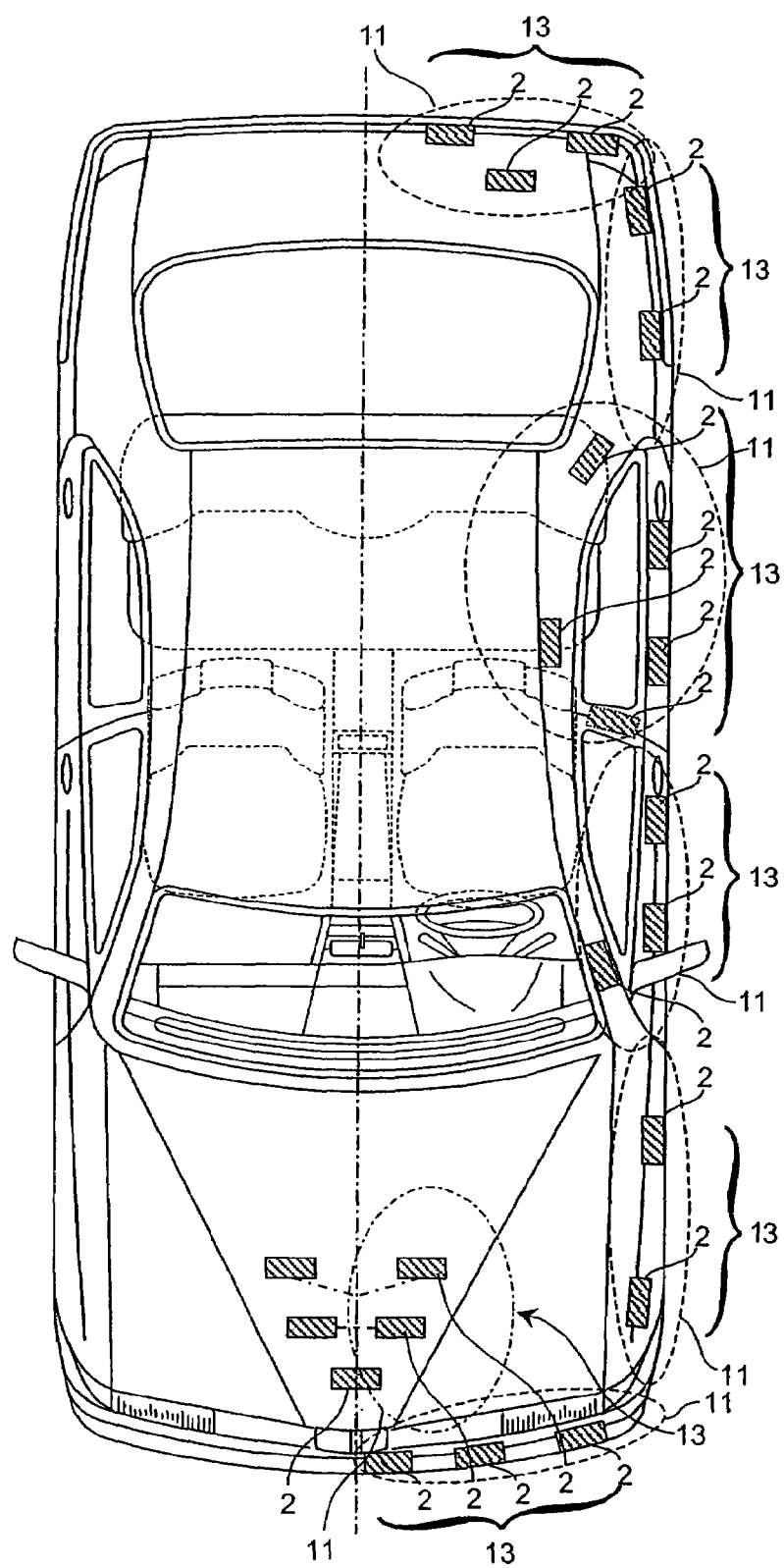
FIG. 2 is a top view of a motor vehicle which on one half is equipped with systems according to the invention.

FIG. 2 is a top view of a motor vehicle, in which, for the sake of clarity, only about fifteen sensors 2 according to the invention are provided on one half. Even this relatively low number of sensors 2 indicates that an installation of such a large number of component parts would not be very practical in a series production. In order to substantially reduce the installation time, not only the number of the components parts, but also their shape and size are adapted. The sensors 2 are each assigned to primary monitoring areas 11 and, for this purpose, are combined in groups 13, which takes the form of a self-adhesive foil carrier that covers the particular monitoring area 11.

Within a group 13, a preprocessing also takes place of the sensor reaction signals 7 (which are not further illustrated), particularly an intensification and coding with an unambiguous assignment of a return or reaction signal 7*i* to a respective sensor 2*i*. Thus, groups 13 of sensors 2 are obtained for the left part of the engine hood, the left front fender, the driver's door, the left rear door into a portion of the roof space, the left rear fender and the left portion of the bumper and the trunk. As a result, particularly accident-prone areas, on the one hand, and areas which are considerably mechanically stressed, on the other hand, are covered by respective monitoring areas 11, particularly the A-, B- and C-columns of the vehicle body. Analogously, in a manner not further indicated in the drawing, the right vehicle half is essentially mirror-symmetrically also equipped with sensors 2.

Figure 3:
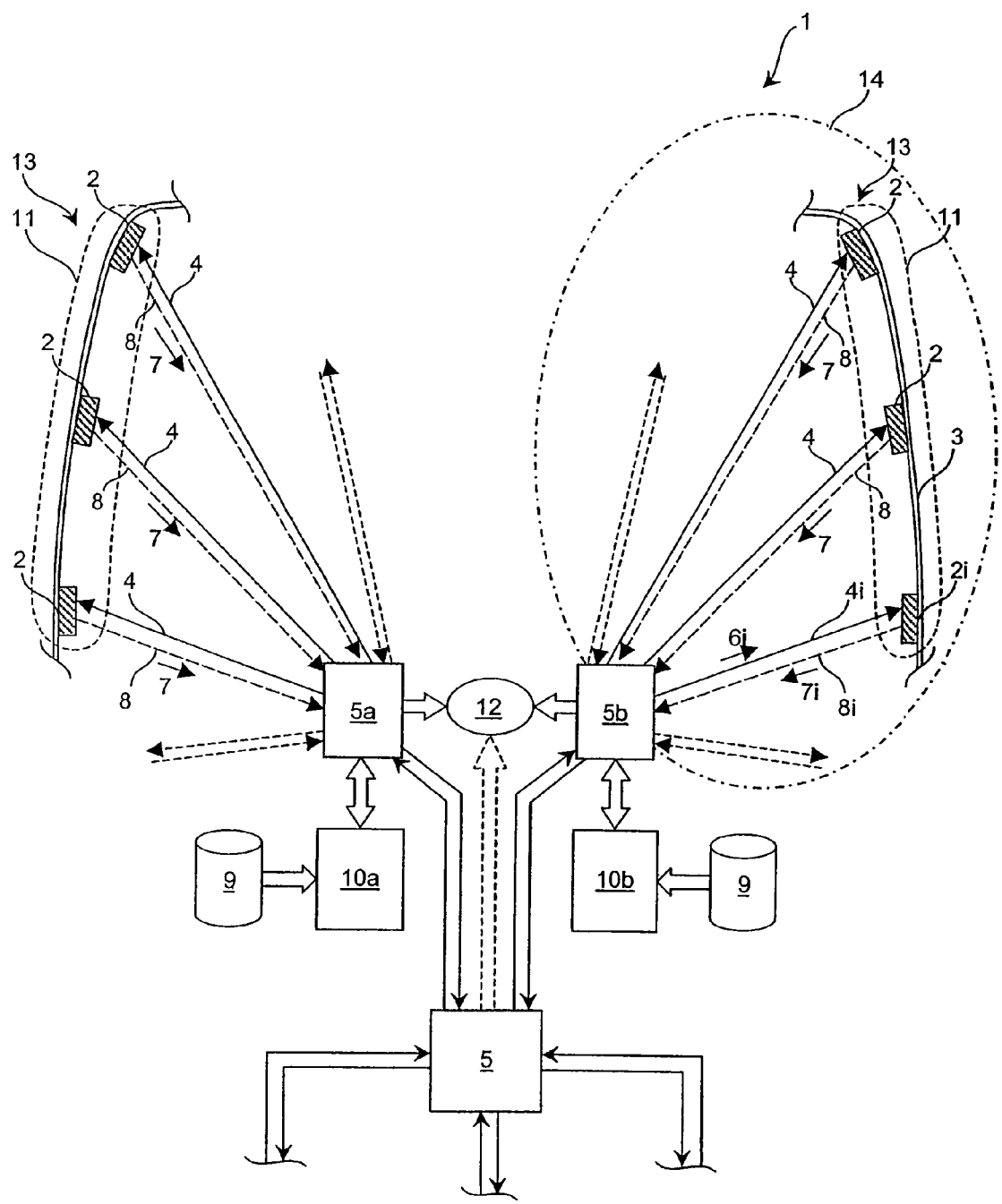
FIG. 3 is a schematic representation of two systems according for monitoring two different areas.

FIG. 3 is a schematic representation of two partial systems 14 according to FIG. 1 with a group formation according to FIG. 2, for monitoring two different monitoring areas 11 on a motor vehicle. Here, the sensor signals are preprocessed by groups, and the groups 14, as modules on the self-adhesive foil carrier, are equipped with a pre-electronic system 5a, 5b and electric signal and supply connections. Having a length of approximately 50 to 60 cm and a width of approximately 10 cm, the flexible self-adhesive foils are equipped with at least two (in the present case, three) sensors 2. In a manner not shown in detail, two such foils are provided for each door, and, in the case of a length of approximately 1 m and a width of approximately 2 cm, for at least ten sensors 2 per foil per bumper, are provided in the arrangement of FIG. 2. For surfaces, such as the engine hood, the trunk lid or the vehicle roof, oval or star-shaped structures are used for such carrier foils with a corresponding arrangement of the sensors 2.

Furthermore, it is indicated in FIG. 3 that at least one safety system 12 can be triggered directly by an assigned pre-electronic system 5a, 5b. For this purpose, the signals 7 determined by the sensors 2 of a group 13 arranged in a distributed manner over an observation or monitoring area 11 are fed via separate lines 8 over a short distance to a respective pre-electronic system 5a, 5b, and are analyzed there separately for each partial system by using assigned databanks 9 and a model 10a, 10b coordinated corresponding to the respective monitoring area 11. As an alternative or in addition, however, a triggering of diverse safety systems 12 can also take place by a central system unit which jointly analyzes pre-evaluated signals of diverse partial systems 14. On this basis, it then becomes possible to arrive at a triggering strategy in the form of a total response of different safety systems which is correspondingly adapted to the respective requirements of an accident.

Figure 4:
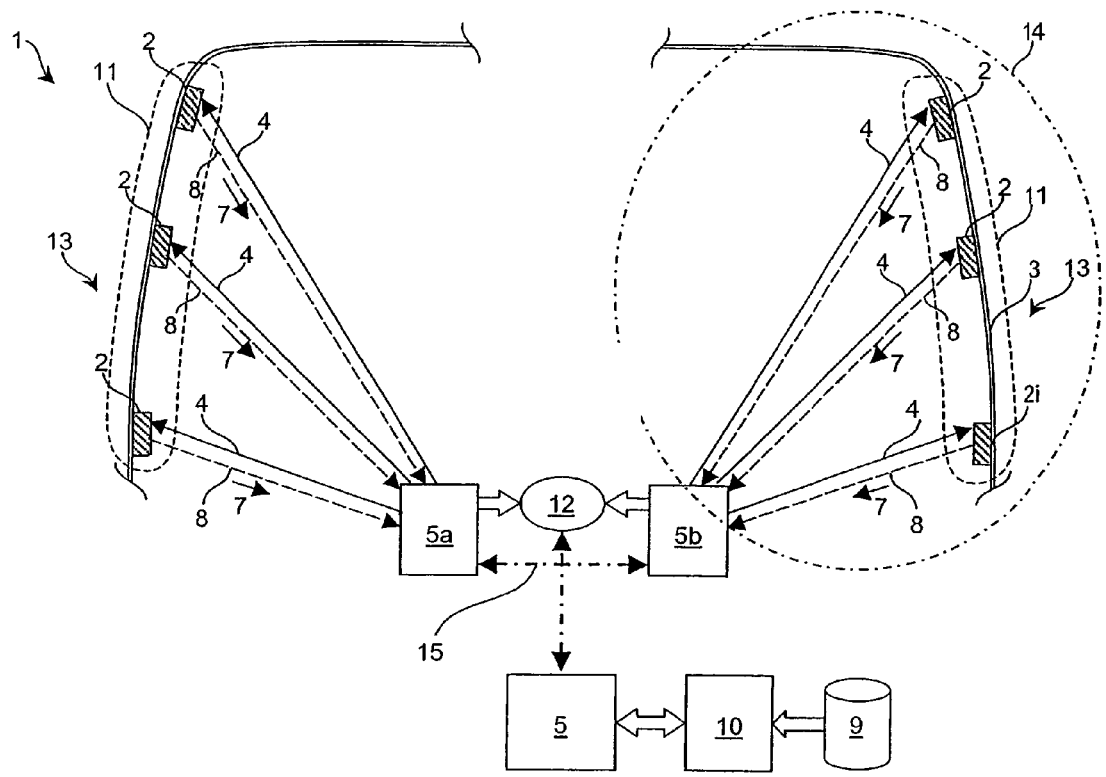
FIG. 4 is a schematic representation of a second embodiment of two systems analogous to the representation of FIG. 3.

Analogous to the representation of FIG. 3, FIG. 4 is a schematic representation of two partial systems 14 in a second embodiment. Here, the signal lines between the pre-electronic systems 5a, 5b and the central system unit 5 are replaced by buses 15. Correspondingly, the groups 14 are now provided as modules on the self-adhesive foil carrier with one pre-electronic system 5a, 5b respectively and electric signal connections for the integration into a bus system. In this case, each of the pre-electronic systems 5a, 5b is used for a signal processing by means of calibration, coordination and initialization as well as a protocol unit for the subsequent data exchange by way of the bus with the central system unit 5. In addition to the high reliability, this solution is characterized by very fast reaction times while the wiring expenditures are considerably reduced, particularly in the electromagnetically considerably stressed engine compartment of a vehicle.

Figure 5:
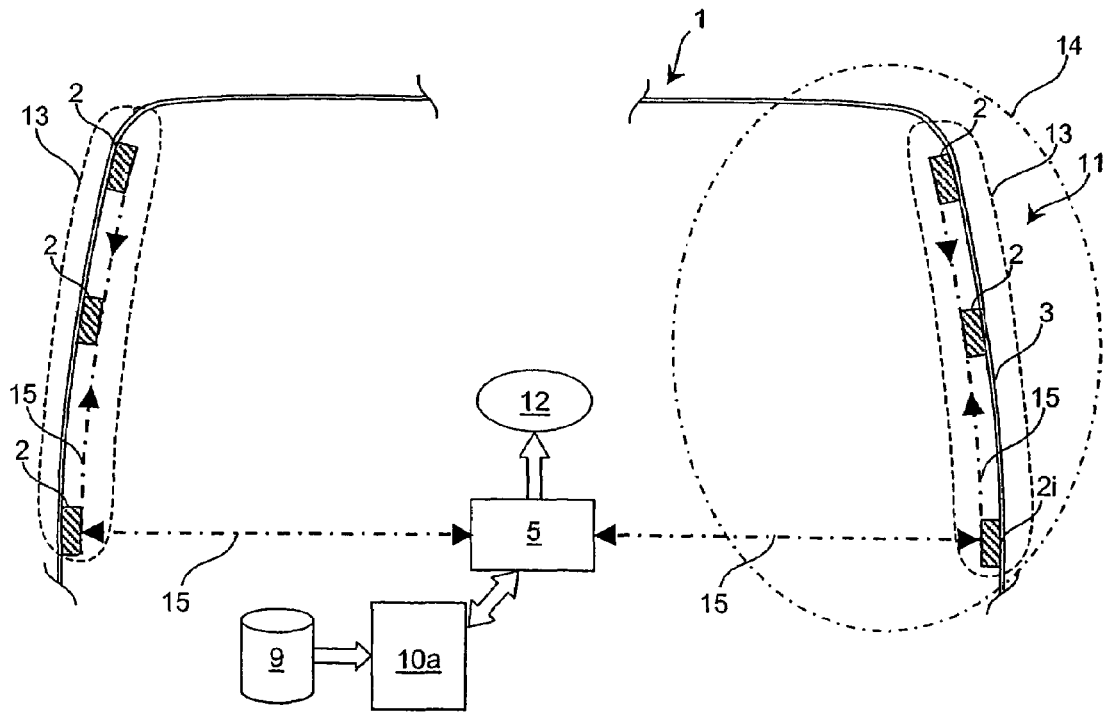
FIG. 5 is a schematic representation of a further embodiment of two systems analogous to the representation of FIGS. 3 and 4.

FIG. 5 is a schematic representation of two systems analogous to the representation of FIGS. 3 and 4 in a further embodiment. As further simplification, in contrast to the embodiment of FIG. 4, the blocks of the pre-electronic system 5a, 5b are eliminated. The sensors 2 of groups 13 are now constructed as active elements with their own intelligence such that they can be directly connected to buses 15 of a uniform bus system. The internal wiring expenditures of each group 13 can thereby be reduced still further, in which case the system architecture becomes even clearer.

Figures 6A, 6B:
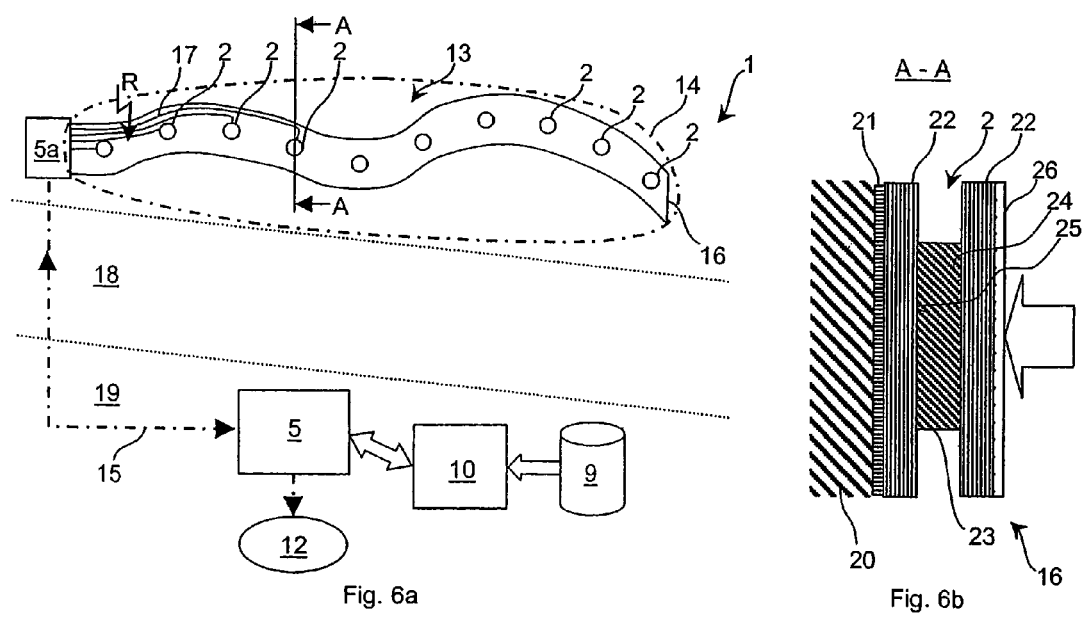

FIG. 6a is an outline of a protection device 1 in the form of a pedestrian protection device. In this embodiment, the group 13 of ceramic sensors 2 is arranged on a flexible foil 16 as the carrier. At one end, the carrier is connected with a pre-electronic system 5a, into which the mutually insulated signal lines 17 originating from the respective sensors 2 lead, for transmitting the individual analogous signals which are preprocessed in the pre-electronic system 5a. Up to the pre-electronic system 5a as the front end, this device is purely passive, in which case a shock, a stroke, a vibration or another impact in the area of the flexible foil 16 triggers corresponding electric signals by means of charge transfers in the affected sensors 2. The data obtained from the individual analogous signals are subsequently transmitted by the pre-electronic system 5a to improve data security via a bus 15 through an, as a rule, EMV stressed engine compartment 18 of the vehicle into an interior 19 to the central system unit 5. There, by using a model 10 together with data from the databank 9, the data are processed which, in the event of the detection of a pedestrian accident, causes the triggering of at least one suitable safety system 12.

To this extent, the pedestrian protection device 1 illustrated with reference to FIG. 6a, with respect to the interior structure, corresponds to one of the two systems described in FIG. 4. Here, the signal lines 4 and return lines 8 provided in pairs for each sensor 2 are constructed to be embedded as signal lines 17 in the flexible foil, which also carries the sensors 2, considerably reducing mounting time and improving the position accuracies of the individual sensors 2. Also, a partial system can be tested for defects by the pre-electronic system, even before the installation.

An enlarged sectional view of the plane A-A of FIG. 6a is illustrated in FIG. 6b for explaining an interior construction of the flexible foil 16 as a carrier of a group 13 of ceramic sensors 2. The flexible foil 16 carries out various tasks: First, it mechanically fixes each sensor 2 of the group 13 on a surface of a body 19 which, in the case of a pedestrian protection device 1, is a mechanically rigid part of the bumper. Such fixing is caused by way of a self-adhesive layer 20 provided on the exterior side on the foil 16. In addition, the flexible foil 16 also provides for electric contact of the sensors fixed on the foil, for which purpose, it is constructed of several layers. In the present example, two foil layers 21 are provided which have electric strip conductors that are each conductively connected with external contacts. These external contact are formed on the sensor body 23 by metallized round exterior surfaces 24, 25 of each of the sensors 2. As a result of an accident-caused compression of the ceramic sensor 2 in the direction of the indicated arrow, a charge change can be measured via the electric strip conductors of the signal lines 17, which are connected with the metallized exterior surfaces 24, 25.

Finally, the foil 16 also offers protection against environmental influences and particularly signal-breakup-causing electromagnetic interferences, etc. For this purpose, it has, on an exterior side situated opposite the self-adhesive layer 20, a metallization layer or metallic protection layer 26 for an EMV (electromagnetic compatibility) shielding. This continuous and grounded protection layer 26 ensures effective protection of the reaction signals 7 of the sensors 2, over the entire relevant spectrum.

In addition to the design of a ceramic sensor 2 illustrated in FIG. 6b, there is also a design, among others, in which the contact surfaces are both arranged on the same exterior surface, for example, by working a through-contacting into the ceramic body 23 of the sensor 2. Correspondingly, when such a sensor design is used in the flexible foil 16, only one foil layer 21 is provided with corresponding mutually insulated signal lines 17 for the electric contacting of the respective sensors 2. In this case, the metallic protection layer 26 can even be sealingly connected with the foil layer 21, by laminating around the respective sensors 2.

The device 1 illustrated in FIGS. 6a and 6b can also be used for additional applications beyond the above-described function, based on a compressive loading of the sensors 2. In the event of a more serious accident, high bending and tensile forces are exerted as a result of extensive deformations of both exterior covering elements and bearing elements of the chassis. Because of the generally small outer dimensions of the bodies of ceramic sensors 2, their susceptibility to bending stress is relatively low. In contrast, the signal lines 17 contained in the flexible foil 16 and particularly in the foil layer 21 have only low durability with respect to such tensile forces. Thus, during an accident, individual, heavily impacted sensors or their signals lines 17 will therefore lose electric contact with the pre-electronic system 5a as a result of an interruption. This malfunction is immediately detected and can be used to locate faults. A tear indicated by an arrow R in FIG. 6a would suddenly separate all sensors except sensor 2 from the pre-electronic system 5a. Simultaneously, a massive disturbance between one remaining addressable sensor and the first no longer electrically reachable sensor 2, could be determined. By way of mechanical surface vibrations, the intact sensor, during the accident, would also receive and transmit characteristic signals which additionally confirm an accident diagnosis and a location.

However, in an application case which is not further shown graphically, the flexible foil 16 of FIG. 6a spans a contact point connected by gluing between a metallic strutting element and a carbon fiber or carbon-fiber-reinforced strengthening element of a vehicle body. Because of their good mechanical characteristics as well as the comparatively low weight, carbon fiber elements or carbon-fiber reinforced elements are increasingly also produced in automobile construction. Since screwed and/or riveted connections require high expenditures, and welded connections between such different materials are excluded, glued connections are now used increasingly. A long-term stability of such (as a rule, also dynamically stressed) glued connections has to be monitored even for safety reasons.

Different approaches are known for this purpose also from the state of the art which, however, cause considerable additional expenses. This is different when a glued connection is bridged by a flexible foil carrier 16 of a safety device 1 according to the invention: Even if such a glued connection detaches other than in connection with an accident, but outside the operation of the concerned vehicle and, in particular, very slowly, such weakening is nevertheless detected by the crack R of the signal lines 17 no later than immediately at the start of the vehicle, and correspondingly reported by way of the pre-electronic system 5a.

When a flexible foil carrier 16 is arranged correspondingly, this safety-relevant monitoring function occurs in addition to the implementation of the actuator-sensor characteristics with the monitoring automatically and without additional costs with respect to the installation and operation.

More extensive prewarning is possible, particularly when monitoring susceptible and safety-relevant connections by using piezo-electric plastic foils as sensors 2. These light, durable flexible bodies 23 of the sensors 2 (whose size is, as a rule, less than 10 cm$_2$) have a thickness of only approximately 5 to 500 µm. Because of their targeted bipolarity, they already carry a charge potential in themselves and, in the event of a compressive or a tensile effect, exhibit a measurable capacitive charge change. Thus, when piezo-electric plastic foils are used for a sensor 2, in addition to the compressive forces illustrated in FIG. 6b, forces acting in the opposite direction as well as shearing forces situated in the plane of the respective flatly constructed sensor 2, etc. can be detected.

The safety system 1 described above can be expanded to a surface covering sensor network by using cost-effective robust reliable and easily mountable sensor elements 2. With the required computer power, which can be controlled on the whole, in addition to a self-test on individual elements and the system entirety, rapid location of disturbances and determination of data concerning the site, the type and the seriousness of a damage but also an active damping of vibrations and resonance phenomena for reducing wear and noise becomes possible.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of operating a sensor in a mechanical system, said method comprising:
   in a test excitation, a central control unit exciting the sensor by an electrical excitation signal, as a reciprocal electromechanical operating system, causing said sensor to generate mechanical vibrations in said system; and
   after said test excitation, the sensor transmitting to the central control unit an electric reaction signal that is indicative of residual vibrational behavior of said system, from the mechanical vibrations that were generated by the sensor in the test excitation;
   wherein the sensor includes a single reciprocal electromechanical element which both receives and reacts to the electrical excitation signal for generating said mechanical vibrations, and generates the electrical reaction signal.

2. The method according to claim 1, wherein
   the sensor is excited to generate a testing excitation for one of diagnostic purposes and testing of the sensor itself.

3. The method according to claim 1, wherein
   said sensor is included in a network of sensors;
   at least one sensor within said network of sensors is excited by an electrical excitation signal; and
   electric reaction signals of all sensors are transmitted to the central system unit.

4. The method according to claim 1, wherein
   at least one sensor is used for locating a resonance zone and for generating a controlled countervibration.

5. The method according to claim 1, wherein:
   control of a phase-shifted vibration is actively generated by the sensor; and
   control of the phase shifted vibration is monitored by additional sensors within the network.

6. The method according to claim 1, wherein the central system unit triggers at least one diagnostic or excitation signal, evaluates at least one reaction signal, and controls active vibration of the sensor.

7. The method according to claim 6, wherein the control takes place based on one of a databank and a model.

8. The method according to claim 7, wherein, in the event of an accident, a course and progression of a deformation, and a type and seriousness of the respective accident, are diagnosed based on comparison of data of the databank with the model.

9. The method according to the claim 8, wherein data processed by the central system unit are transmitted to a safety device for initiating coordinated protection strategies by using at least one of an air bag system, a belt-tightening system, and an active engine hood.

10. Apparatus for monitoring or analyzing and preventing vibration damage in a mechanical system, said apparatus comprising:
   a sensor having a reciprocal material characteristic; and
   a central control unit connected to the sensor for targeted excitation and signal analysis, and further evaluation;
   wherein said central control unit is programmed to implement a method including,
   in a test excitation, the central control unit exciting the sensor by an electrical excitation signal, as a reciprocal electro-mechanical operating system, causing said sensor to generate mechanical vibrations in said system; and
   after said test excitation, the sensor transmitting to the central system unit an electric reaction signal that is indicative of residual vibrational behavior of said system from the mechanical vibrations that were generated by the sensor in the test excitation; and
   wherein, the sensor includes a single reciprocal electro-mechanical element which both receives and reacts to the electrical excitation signal for generating said mechanical vibrations, and generates the electrical reaction signal.

11. The apparatus according to claim 10, wherein:
   said sensor is included in a network of sensors which are arranged in a distributed manner over a monitoring area and are each connected with the central system unit by way of their own separate signal lines and return lines.

12. The apparatus according to claim 10, wherein the central system unit is connected with one of a coordinated model of the monitoring area and a databank.

13. The apparatus according to claim 10, wherein said sensor is included in a network of sensors, which are combined into groups.

14. The apparatus according to claim 13, wherein the sensors are arranged in or on a flexible foil as a carrier.

15. The apparatus according to claim 14, wherein signal lines and return lines are arranged as signal lines for each sensor in or on the flexible foil, as a carrier of the sensors.

16. The apparatus according to claim 15, wherein correspondingly mutually insulated signal lines for electric contacting of the respective sensors are provided in a foil layer of the flexible foil.

17. The apparatus according to claim 16, wherein a piezoelectric plastic foil is provided as a sensor.

18. A method of operating a sensor in a mechanical system which includes mechanical components, said method comprising:
   providing in said system a sensor in the form of an electromechanical element which is operable as both an actuator for generating mechanical vibrations in response to an electrical excitation signal, and a sensor for receiving mechanical vibrations and generating electrical signals indicative thereof;
   in a test excitation, stimulating said electromechanical element with an electrical excitation signal, such that it generates mechanical vibrations in said system;
   after said test excitation, said electromechanical element receiving and generating electrical signals indicative of, residual vibrational behavior of said system resulting from said mechanical vibrations that were generated by the electromechanical element in the test excitation;
   evaluating a state of said system based on said electrical signals generated by said electromechanical element and on stored characteristic signals.

19. The method according to claim 18, wherein said evaluating step comprises evaluating an operational status of said electromechanical element.

20. The method according to claim 18, wherein said evaluating step comprises evaluation of said mechanical components in said system.

21. A method for operating a transducer for detecting vibrations in a mechanical system, said method comprising:
   in a test excitation, operating the transducer as an actuator to generate vibrations in said mechanical system;
   thereafter, operating the transducer as a sensor to detect residual vibrations in said system, and to generate electrical signals indicative of said residual vibrations;
   analyzing said electrical signals to evaluate the status of said transducer.

* * * * *